United States Patent
Heinle et al.

(10) Patent No.: US 7,128,178 B1
(45) Date of Patent: Oct. 31, 2006

(54) VEHICLE COOLING RADIATOR ARRANGEMENT

(75) Inventors: Hans Heinle, Biessenhofen (DE); Michael Herold, Marktoberdorf (DE); Alois Sprenzel, Marktoberdorf (DE); Walter Wagner, Ebersbach (DE)

(73) Assignee: AGCO GmbH & Co (DE)

( * ) Notice: Subject to any disclaimer, the term of this patent is extended or adjusted under 35 U.S.C. 154(b) by 0 days.

(21) Appl. No.: 09/295,830

(22) Filed: Apr. 21, 1999

(30) Foreign Application Priority Data

Apr. 21, 1998 (GB) ................... 9808293.6

(51) Int. Cl.
*B60K 11/04* (2006.01)

(52) U.S. Cl. .............. 180/68.4; 180/68.2; 165/41

(58) Field of Classification Search ............... 180/68.1, 180/68.2, 68.4, 69.2; 165/41
See application file for complete search history.

(56) References Cited

U.S. PATENT DOCUMENTS

| | | | | | |
|---|---|---|---|---|---|
| 2,236,461 | A | * | 3/1941 | Belaieff et al. | ............ 180/68.4 |
| 3,203,499 | A | * | 8/1965 | Bentz et al. | ................ 180/68.4 |
| 3,921,603 | A | * | 11/1975 | Bentz et al. | ................ 180/68.4 |
| 4,116,265 | A | * | 9/1978 | Staebler | ...................... 180/68.4 |
| 4,160,487 | A | * | 7/1979 | Kunze et al. | .............. 180/68.4 |
| 4,315,540 | A | * | 2/1982 | Moranne | .................... 180/68.4 |
| 4,339,014 | A | * | 7/1982 | Berth et al. | ................. 180/68.4 |
| 4,632,206 | A | * | 12/1986 | Morinaka et al. | .......... 180/68.4 |
| 4,771,844 | A | * | 9/1988 | Bassett | ....................... 180/68.4 |
| 5,046,550 | A | * | 9/1991 | Boll et al. | ................. 180/68.4 |
| 5,234,051 | A | * | 8/1993 | Weizenburger et al. | ..... 180/68.1 |
| 5,492,167 | A | * | 2/1996 | Glesmann | .................. 180/68.4 |
| 6,564,857 | B1 | * | 5/2003 | Zobel et al. | ................... 165/41 |
| 6,886,624 | B1 | * | 5/2005 | Zobel et al. | ................... 165/41 |

FOREIGN PATENT DOCUMENTS

| | | | | |
|---|---|---|---|---|
| DE | 24065 | * | 10/1955 | ................ 180/68.4 |
| DE | 3118539 A1 | | 12/1982 | |
| DE | 29504867 UI | | 7/1996 | |
| DE | 19724728 A1 | | 2/1999 | |
| GB | 1419035 | | 12/1975 | |
| GB | 1516057 | | 6/1978 | |
| GB | 2234720 A | | 2/1991 | |
| GB | 2234721 | * | 2/1991 | ................ 180/68.4 |

* cited by examiner

*Primary Examiner*—Frank Vanaman
(74) *Attorney, Agent, or Firm*—MacMillan, Sobanski & Todd, LLC

(57) ABSTRACT

An arrangement of radiators (2–6) for a utility vehicle, e.g., an agricultural tractor, comprising three or more cooling radiators which together define a chamber (7), optionally with some of the walls formed by perforated plates instead of radiator elements. One of the radiator elements may be pivotally mounted with respect to the others to provide access to the chamber. The arrangement of radiators may be mounted on a common support (1).

4 Claims, 2 Drawing Sheets

VEHICLE COOLING RADIATOR ARRANGEMENT

BACKGROUND TO THE INVENTION

The invention relates to an arrangement of three or more cooling radiators for a utility vehicle, such as an agricultural tractor.

Powerful utility vehicles, such as agricultural tractors, for example, require a number of radiators in order to re-cool the working media, such as coolant water for the engine, transmission oil and hydraulic oil amongst others, as they become heated during use. These days, it is common practice to provide the requisite radiators in a parallel arrangement one after the other so that the coolant air flows through radiators. However, there are certain disadvantages to this layout. Arranging the radiators one after the other results in a high resistance to air flow which, apart from making it necessary to provide a disproportionately powerful fan, can also cause lead to an interruption in the flow, which results in the radiators becoming overheated. The lower temperature differential available to the radiators also makes it necessary to provide radiators of a larger size. In addition, any dirt which gets into radiator fins, particularly those of the radiators at the rear, is very difficult or totally impossible to remove completely without dismantling the radiators. The presence of dirt poses the risk of local overheating in the radiators.

SUMMARY OF THE INVENTION

An objective of the invention is to provide an arrangement of three or more radiators of the generic type outlined above which is efficient, easy to maintain and not susceptible to failure.

According to the invention, an arrangement of cooling radiators is provided.

The advantage of this arrangement is that the flow resistance is reduced when compared to three parallel radiators one after the other, which means that smaller radiators can be used to achieve the same cooling effect. Access to the radiators is also easier.

Preferably, the arrangement also ensures, that there are no "short circuits" of air flow resulting in localised hot spots on any of the radiators. Preferably access is provided means of the features set out in claim 3.

Other preferable features are set out in the dependent Claims.

In general, the arrangement specifically described herein provides an inner chamber surrounded on most sides by radiators, which makes for ready access to the sides of the radiators on the interior, provided one of the radiators is pivotably mounted or detachable. Any dirt which has become stuck to the radiator fins can be removed easily using compressed air for example.

In addition, the radiator arrangement reduces the overall flow resistance in the radiators, resulting in low flow losses, thus providing a system of radiators which operates satisfactorily, even with a conventional fan, and is not susceptible to failure. This can largely be ascribed to the fact that relatively large cooling surfaces can be provided by arranging the radiators in the layout proposed by the invention, allowing the air to flow at a low rate and the fact that the entire coolant air induced, which does not contain any outside air, has to flow through two radiators only. Not to be overlooked, however, is the fact that a part of the dirt which might be contained in the air flowing through the radiators at the front is left in the inner chamber, which not only means that the efficiency of the rear radiator remains unaffected for a longer time but also the under-pressure prevailing in the inner chamber during this time is that required to induce a sufficient quantity of coolant air through the radiators connected at the front end.

In one practical arrangement of the invention, the radiators are mounted on a common radiator support. With this design, the radiator system can be assembled beforehand. This means that the entire radiator system can be provided as a unit which is pre-assembled by the radiator manufacturer and fitted as part of the assembly process by the vehicle manufacturer. Advantageous features of the radiator support are set out in some of the following dependent claims.

In the case of cooling systems in which not all the possible locations for radiators will be used, for example because the vehicle does not have a hydraulic system and does not therefore require the radiator for the hydraulic oil, a practical solution is to replace the radiators arranged to front of the bracket with air permeable plates, whose resistance to the passage of air corresponds to that of the radiators which they have replaced. The under-pressure generated in the inner chamber due to the fan will then remain the same as it would be in a cooling system with a radiator for hydraulic oil and hence also the through-put of air through the system.

BRIEF DESCRIPTION OF THE DRAWINGS

An embodiment of the invention will now be described in more detail below with reference to drawings. Of these.

DETAILED DESCRIPTION

Figure 1:
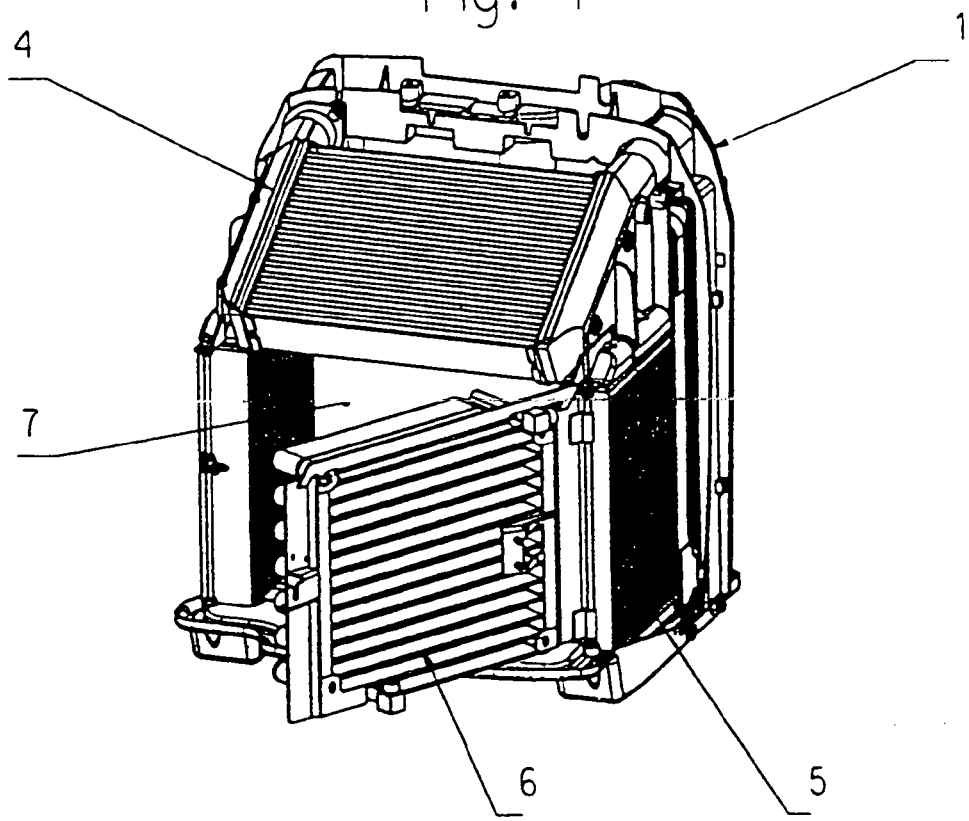
FIG. 1 is a perspective view of a cooling system seen from the front.
Figure 2:
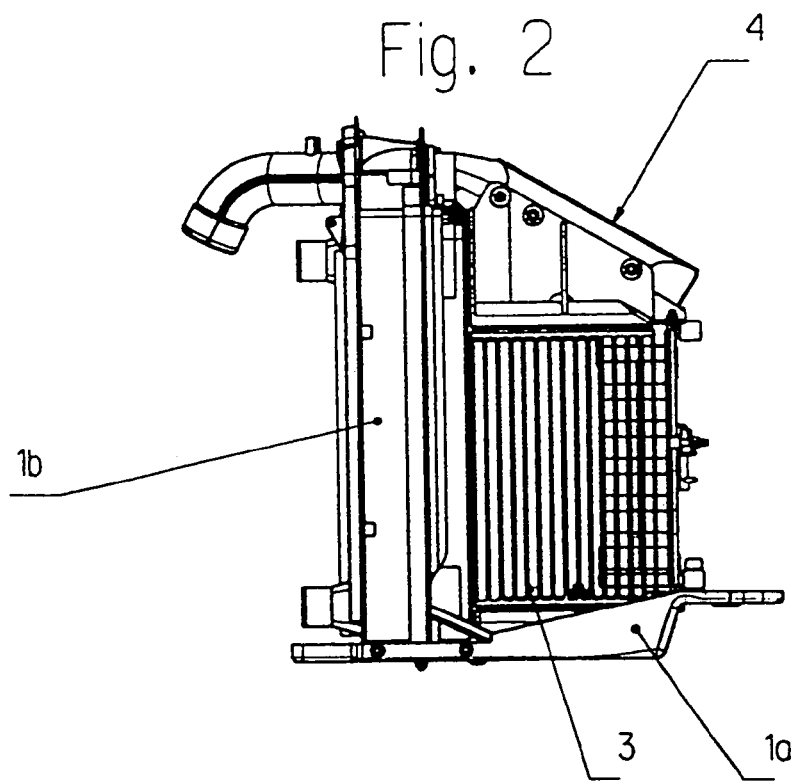
FIG. 2 is a side view of the cooling system of Figure.
Figure 3:
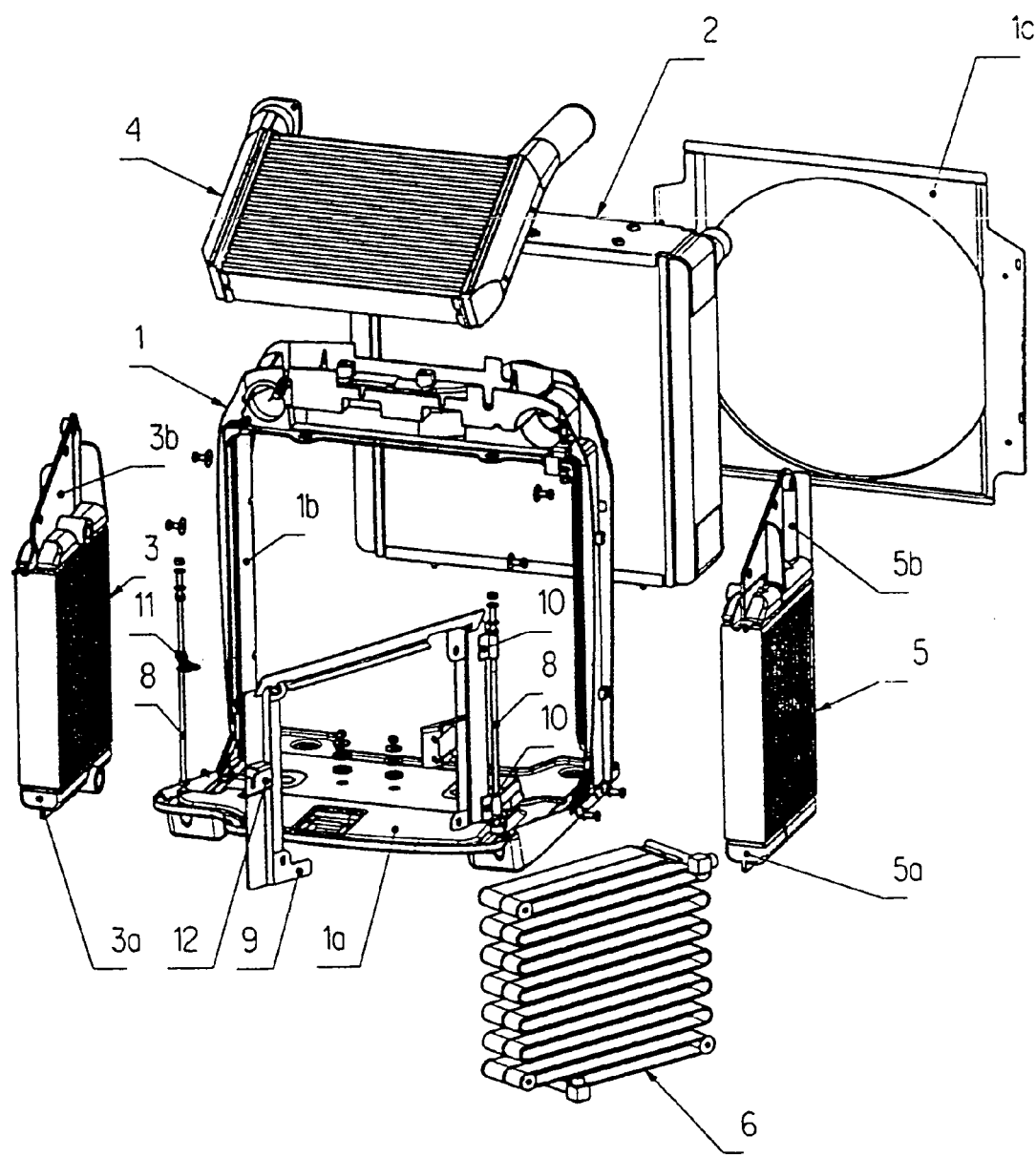
FIG. 3 is an exploded diagram of the cooling system of FIG. 1.

The cooling system illustrated in the drawings is designed to be provided as a pre-assembled unit which can be mounted and secured directly onto a vehicle frame, not illustrated, in front of a fan.

This unit has a radiator support 1, on which several radiators are arranged. These are a rear water radiator designated by reference 2, a gear oil radiator 3, a booster air radiator 4, a combined radiator 5 for hydraulic oil and fuel as well as a condenser 6 for the air-conditioning system. Depending on the vehicle and the application for which it will be used, radiators which are not required can be replaced by radiators for other media or by air permeable plates. This being the case, the replacement plates can be designed in such a way that they have the same resistance to through-flow as the radiator which they replace.

Being the radiator with the largest surface area in this embodiment, the water radiator 2 is mounted in the interior of a bracket 1b, which is secured at the rear end region of the radiator support 1 so as to stand upright on the lower part 1a thereof. A fan deflector guide 1c is fixed to the bracket 1b behind the water radiator 2. All the other radiators are arranged in front of the bracket 1b in the longitudinal direction of the vehicle. Arranged the farthest forward, parallel with and at a long distance from the water radiator 2 is the condenser 6. The region between the water radiator 2 and the condenser 6 is delimited on the one side by the radiator 3, on the other side by the radiator 5 and at the top by the radiator 4, thereby forming an inner chamber 7. At their bracket-ends, the radiators 3 to 5 are secured to the bracket 1b at the peripheral regions and are joined to one another at their adjacent peripheral regions. The radiators 3, 5 at the sides are provided with plug elements 3a, 5a on the underside thereof and are supported in matching counter elements on the lower portion 1a. In order to fix the plug connections, the radiators 3, 5 are braced at their front end region with the lower portion 1a by means of long, vertical retaining screws 8.

Various points at which the radiators 3 to 5 abut with one another and with the radiator support 1 are designed so as to be air-tight due to matching contours of the radiators and/or by the use of appropriate sealing materials, so that air can enter the radiators via the inner chamber 7 only. As can be seen, the radiators 3, 5 at the sides are provided with matching formed plates 3b, 5b for this purpose, which fill the region between these radiators and the radiator 4 extending down towards the front on a level with the condenser 6.

The condenser 6 is not joined to either of the adjacent radiators 3 to 5. Instead, it is secured onto a frame 9 which can be pivoted by means of lateral joints 10 about one of the retaining screws 8, in order to provide ready access to the inner chamber 7 for maintenance work. The other retaining screw 8 is used to secure the condenser 6 in the closed position in which it is sealed against outside air by means of known locking elements 11, 12.

Lastly, in a modification of this embodiment, two or more sides of the chamber 7 are provided by a single, angled or curved radiator.

What is claimed is:

1. A radiator arrangement for a vehicle comprising:
    a support including a lower generally horizontal portion that forms a chamber base having first, second, third and fourth edges, said support further including a generally vertical portion extending from said first edge of said lower generally horizontal portion;
    a first radiator supported on said generally vertical portion of said support and extending upwardly from said lower portion of said support to form a first chamber wall;
    a second radiator supported on and extending upwardly from said second edge of said lower generally horizontal portion of said support to form a second chamber wall;
    a third radiator supported on and extending upwardly from said third edge of said lower generally horizontal portion of said support to form a third chamber wall;
    a condenser supported on and extending upwardly from said fourth edge of said lower generally horizontal portion of said support to form a fourth chamber wall;
    a fourth radiator supported above said first radiator, said second radiator, said third radiator, and said condenser to form a chamber top, wherein a chamber is defined by said lower generally horizontal portion of said support, said first radiator, said second radiator, said third radiator, said fourth radiator, and said condenser; and
    a fan deflector guide supported on said vertical portion of said support externally of said chamber, said fan deflector guide adapted to support a fan thereon for drawing air into said chamber through said second, third, and fourth radiators and said condenser and for drawing air out of the chamber through said first radiator.

2. The radiator arrangement defined in claim 1 wherein said second radiator has a plug element that is received in a matching counter element in said lower portion of said support.

3. The radiator arrangement defined in claim 1 wherein said second radiator has a plug element that is received in a matching counter element in said lower portion of said support, and wherein said third radiator has a plug element that is received in a matching counter element in said lower portion of said support.

4. The radiator arrangement defined in claim 1 further including a frame that is pivotably supported on said support, and wherein said condenser is supported on said pivotable frame.

* * * * *